Figure 1:
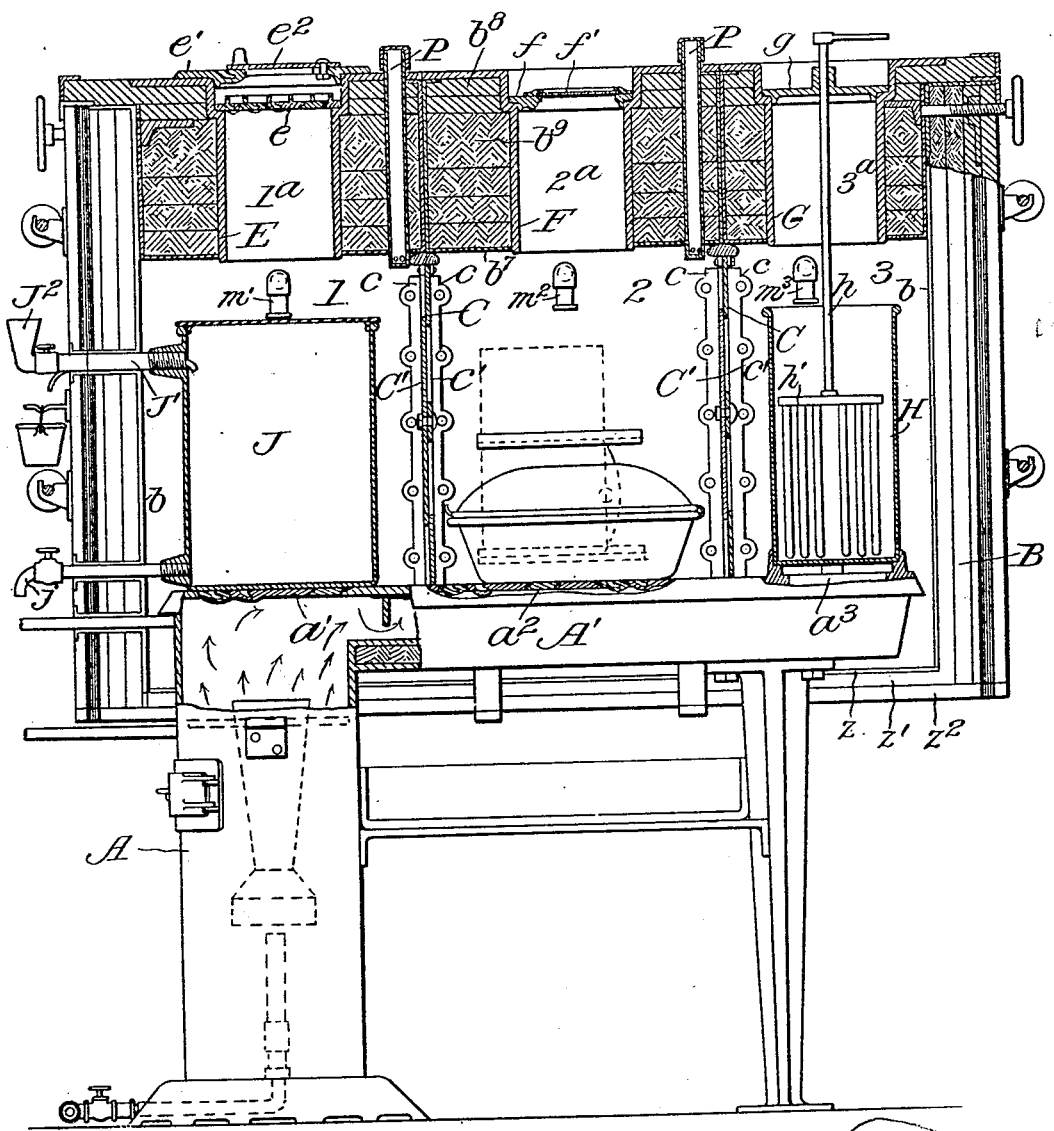

No. 834,222. PATENTED OCT. 23, 1906.
V. W. BLANCHARD.
COOKING APPARATUS.
APPLICATION FILED JAN. 22, 1906.

2 SHEETS—SHEET 1.

Witnesses
C. H. Walker.
James R. Mansfield

Inventor
Virgil W. Blanchard
By Alexander F. Dowell
Attorneys

No. 834,222. PATENTED OCT. 23, 1906.
V. W. BLANCHARD.
COOKING APPARATUS.
APPLICATION FILED JAN. 22, 1906.

2 SHEETS—SHEET 2.

Witnesses
Inventor
Virgil W. Blanchard
By
Alexander & Dowell
Attorneys

UNITED STATES PATENT OFFICE.

VIRGIL W. BLANCHARD, OF NEW YORK, N. Y.

COOKING APPARATUS.

No. 834,222.   Specification of Letters Patent.   Patented Oct. 23, 1906.

Application filed January 22, 1906. Serial No. 297,255.

*To all whom it may concern:*

Be it known that I, VIRGIL W. BLANCHARD, of New York, in the county of New York and State of New York, have invented certain new and useful Improvements in Cooking Apparatus; and I hereby declare that the following is a full, clear, and exact description thereof, reference being had to the accompanying drawings, which form part of this specification.

This invention is an improvement in apparatus for cooking with gaseous fuel and its object is to provide a gas-burning cooking-range of large capacity in which the cooking operations are principally performed by means of stored or accumulated heat in the cooking-chambers, such heat being preferably generated by means of a gas-burning apparatus.

The object of the present invention is to provide a series of cooking-compartments within a large heat accumulating and storing chamber or casing, the several compartments being directly connected with the heat-generating apparatus, so that cooking operations can be performed therein separately or simultaneously. I further provide means whereby the several compartments can be heated from one common heater, and, if desired, the heat-gases may be supplied continuously to one or more of the compartments during the cooking operations therein, or the supply of heating-gases may be cut off or materially reduced in quantity and the cooking operations performed by the means of the accumulated heat stored up into the walls of the inclosing casing.

The invention will be more fully understood from the following description of the apparatus shown in the drawings which embodies the invention, and the combination of parts for which protection is desired in this application is set forth in the claims following the description.

Figure 2:
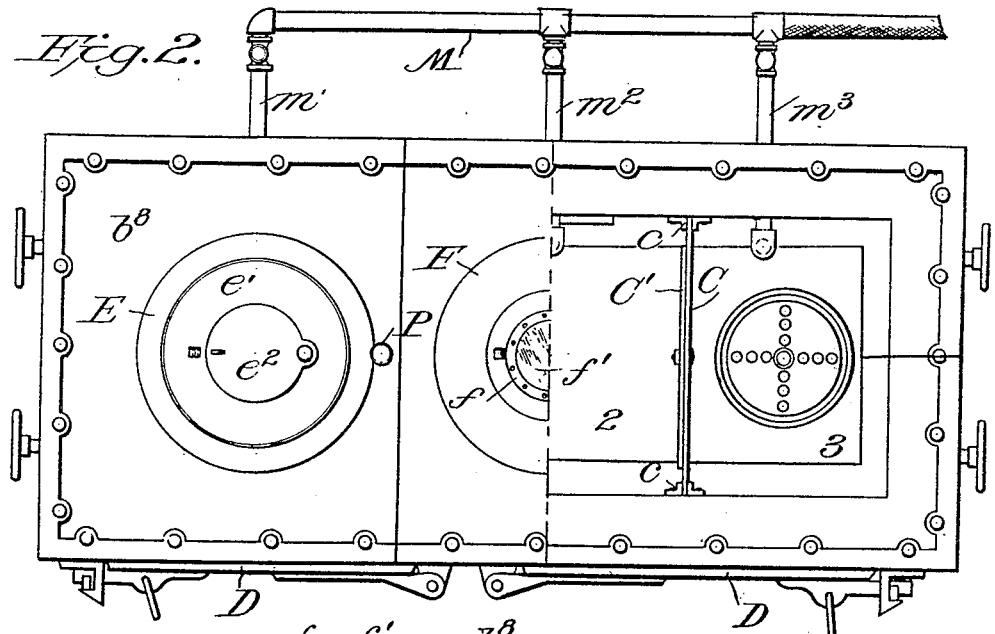
Figure 3:
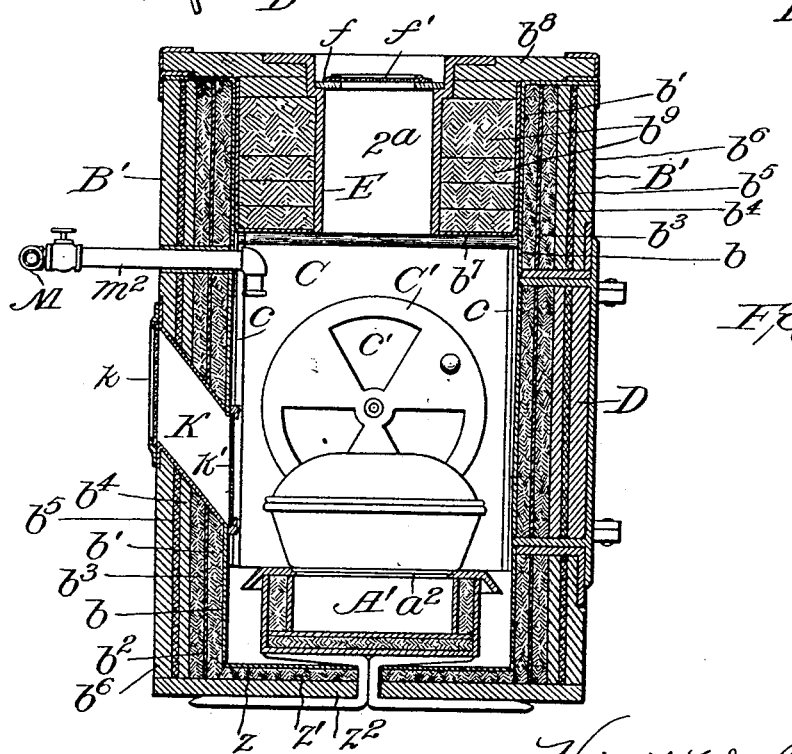

Figure 1 is part longitudinal section and part elevation of the complete apparatus. Fig. 2 is a plan view thereof with part of the cover removed, and Fig. 3 is a central vertical transverse section of the apparatus.

In said drawings, A designates a heat-generating apparatus the outlet of which connects with a horizontal range portion A'. The upper part of the stove and the range portion A' thereof are inclosed within a large heat-storing chamber or casing B, which is constructed, preferably, in two opposite vertical and longitudinal separable sections B', which are fitted at their lower ends around the upper portion of the stove and inclose the range portion A' thereof, as indicated in Figs. 1 and 2 of the drawings.

The particular means by which the sections are fastened together around the stove are not claimed herein and neither is the particular construction of the non-heat-conducting walls thereof. The heat-storing chamber or casing B might be permanently built around the range, as indicated in the drawings. The side walls of the chamber are preferably composed of an inner lining $b$, of metal, adjacent to which is a layer of asbestos $b'$, outside of which is a layer of metal $b^2$, outside of which is a layer of non-heat-conducting material $b^3$, outside of which is a layer of wood $b^4$, surrounded by a layer of felt $b^5$, and the whole inclosed by an outer layer or sheath of wood $b^6$. This construction renders the walls practically impervious to heat and cold, although the inner metallic parts are adapted to store a large amount of heat, while loss of heat by extraneous radiation or convection is prevented, so that the outside of the casing will be practically cold, while the inside may be at a very high temperature.

The bottom of the casing may be constructed of an inner metal plate $z$, a non-heat-conducting layer $z'$, and an exterior sheath $z^2$. The bottom might be constructed like the sides, if desired; but as the natural tendency of heat is to rise in the chamber it is not necessary to have the bottom as thick as the side walls. The upper end or roof of the chamber may be closed by a suitable non-heat-conducting wall and, as shown, is made thicker than the side walls, having an internal plate $b^7$ and top plate $b^8$, of wood, and successive layers of non-heat-conducting material $b^9$, by which loss of heat by conduction or radiation will be prevented. I preferably make the top cover of the casing removable and in transverse sections; but in the present case the cover may be either removable or permanently secured in position.

The interior of the heat-accumulating chamber is preferably divided into a series of compartments 1, 2, and 3, as shown, by transverse partitions C, which may be formed by metal plates having their side edges confined in guides $c$, attached to the inner side walls of the chamber, and said plates may be provided with apertures $c'$ and with valves $C'$, whereby the openings $c'$ can be closed if it is desired to shut off direct communication between the compartments 1 2 3. Access can be had to these compartments through openings in the front side of the casing, which openings may be closed by doors D, that are preferably lined with non-heat-conducting layers similar to the side walls and fit closely in the openings, so that they will serve to store heat and prevent loss thereof when closed.

The top plate of the stove and range is provided with openings $a'$ $a^2$ $a^3$, through which the heated gases can be supplied directly into the several compartments 1 2 3. These openings $a'$ $a^2$ $a^3$ may be closed by removable plates, if desired, so as to direct the principal heat into any one or more of the compartments when the other compartments are not being used for cooking by direct heated gases supplied from the stove A.

In the upper part or cover of the chamber are openings $1^a$ $2^a$ $3^a$, in which may be fitted metallic collars E F G and which are closable by suitable plates, so that the escape of the heat from the compartments can be prevented and properly regulated. In the collar E above compartment 1 I preferably place a set of griddle-plates $e$, above which the mouth of the collar E is closed by a plate $e'$, having an opening in it closed by a valve $e^2$. The plates $e$ and $e'$ can be removed, and, if desired, a domestic boiler can be placed over the opening to be heated. The opening in collar F may be closed by a plate $f$, provided with a mica or glass sight $f''$, by which the condition of articles in compartments 2 can be visibly inspected from above without opening the doors in the casing.

In the rear wall of the central compartment (see Fig. 3) is an upwardly-inclined opening K, whose ends are closed by panes $k\ k'$, of mica, so as to prevent the loss of heat by conduction from the compartment and which will admit light into compartment 2, so the condition of any article of food being cooked in said compartment can be readily determined, the upper plate $f''$ admitting light directly down into the compartment. If desired, similar visual inspection-openings may be made in the walls of compartments 1 and 3.

The opening above compartment 3 can be closed by a plate $g$, which in the example shown forms a guide-bearing for the upper end of a rod $h$, to the lower end of which is attached a stirrer $h'$, operating in a vessel H, placed over the outlet $a^3$ from the range extension A' in compartment 3. Obviously the openings in the upper ends of the several compartments could be closed by similar devices, if desired.

I have shown in compartment 1 a water-heater or boiler J above the outlet $a'$ from the stove A. Water can be supplied to the vessel J through a pipe J', connected with a funnel $J^2$ on the outside of the casing, and can be withdrawn from the vessel J through a valve-pipe $j$, connected with the lower end thereof and extending outside of the casing. The stove and range form a support for the heat-storing chamber, as is indicated in the drawings, and the cooking operations can be carried on in the compartments, as hereinafter explained.

I have indicated a gas-supplying pipe M adjacent to casing, having branches $m'$ $m^2$ $m^3$ entering the compartments 1 2 3 for the purpose of supplying a non-oxidizing gas thereinto. In practice after the heat-storing chamber is thoroughly heated and ready for operation the compartments may be filled with carbonic-acid gas, so that the cooking operations can take place in a non-oxidizing gaseous medium; but I do not herein claim the particular means or process of cooking with such gas, as this forms the subject-matter of another application.

Operation: The gas and the heated products of combustion generated in the stove A are admitted into the storage-chamber through the several outlets, the fire being maintained in the stove until the interior of the chamber and parts therein have become highly heated. This does not require either a great expenditure of fuel in the stove nor a long time, because the heat is readily absorbed by the interior portions of the walls of the casing and cannot escape to the exterior thereof. In order to produce circulation of the hot gases through the compartments, one or more of the covers in the openings in the roof of the compartments 1 2 3 may be partly opened, and, if desired, the several valves $C'$ may be opened to permit direct circulation of the hot gases through the several compartments. When the storage-chamber has been sufficiently heated, the temperature of which can be readily determinable by means of pyrometers inserted through openings or tubes P in the cover, the stove may be shut down or entirely closed off. The articles to be cooked can then be placed in the several compartments as desired and will be cooked by reason of the accumulated heat stored up in the walls thereof, which will be radiated interiorly thereinto, but confined therein by the non-heat-conducting walls of the casing. If desired, while food is being cooked in one or more compartments by the stored or accumulated heat, food may be cooked in another compartment—as compartment 3, for example—by means of direct heat applied thereto from the stove and admitted thereinto through opening $a^3$. The cover of such compartment can be slightly raised, so as to cause a circulation of the heated gases therethrough. Similarly, in like manner any compartment 1 2 3 can be heated by direct gases, while other compartments are being used to cook by stored heat.

Of course the number of compartments within the apparatus can be varied to suit the particular use for which it is designed or the requirements of the owner for whom it is built, and I do not restrict myself to the particular form or construction of parts illustrated in the drawings.

Having thus described my invention, what I therefore claim as new, and desire to secure by Letters Patent thereon, is—

1. The combination of a gas-burning stove having a range extension, provided with openings, with a heat-storing chamber inclosing the upper portion of the stove and range and divided into compartments one over each opening in the stove, an outlet-opening in the upper end of each compartment, a removable closure for each outlet-opening, and removable closures for the openings in the range whereby the heating-gases may be directed to any compartment of the storing-chamber.

2. The combination of a gas-stove having range extensions provided with a series of openings in its top, and a heating-chamber inclosing the upper portion of the stove and the range extension, and vertical partitions in said chamber dividing it into a series of compartments which respectively communicate with the respective openings, an outlet in the top of each compartment and a removable closure for each outlet.

3. The combination of a gas-stove having a series of openings in its top, and a heating-chamber inclosing the upper portion of the stove and having a series of vertical partitions dividing its interior into compartments which respectively communicate with the respective openings, valved openings in the partitions between the several compartments, a cover or top closing each compartment and provided with an outlet, and a removable plate closing the outlet in the cover.

4. The combination of a gas-stove having a series of openings in its top, and removable closures for the openings, with a heat-storing chamber inclosing the upper portion of the stove, and having a series of vertical compartments which respectively communicate with the respective openings in the top of the range, valved openings in the partitions between the several compartments, a removable cover or top closing each compartment and provided with an opening into each compartment, and a removable plate closing each opening in the cover.

5. The combination of a gas-burning stove, a flue extension communicating with the outlet thereof provided with openings, removable closures for said openings, a casing inclosing said flue extension and divided into compartments above the extension by partitions, each compartment being over one of the openings in the flue extension; a cover for said compartment, outlets in the cover communicating with the respective compartments, and removable closures for said outlets.

6. The combination of a heating-range having openings in its top, closures for said openings, a casing having non-heat-conducting walls and inclosing the upper part of the range, transversely-arranged partitions in said casing above the range dividing it into compartments one over each opening, an outlet in the top of each compartment, and removable closures for said outlets.

7. The combination of a heating-stove having a range extension A', a casing above the stove inclosing the extension A' and having non-heat-conducting walls, transversely-arranged partitions C in said casing dividing it into compartments, an outlet-opening in the top of each compartment, removable closures for said outlets, an opening in the side of each compartment, doors closing said side openings, and valved openings in the partitions C.

In testimony that I claim the foregoing as my own I affix my signature in presence of two witnesses.

VIRGIL W. BLANCHARD.

In presence of—
 JAMES R. MANSFIELD,
 L. E. WITHAM.